(12) United States Patent
Eshmawy et al.

(10) Patent No.: US 6,751,203 B1
(45) Date of Patent: Jun. 15, 2004

(54) METHODS AND APPARATUS FOR THE PRODUCTION OF ECHO FREE SIDE TONES

(75) Inventors: Waleed Eshmawy, Piscataway, NJ (US); Raziel Haimi-Cohen, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 841 days.

(21) Appl. No.: 09/643,165

(22) Filed: Aug. 21, 2000

(51) Int. Cl.$^7$ ................................................ H04B 3/20
(52) U.S. Cl. .................................. 370/286; 379/406.01
(58) Field of Search ................................ 370/201, 276, 370/286, 282, 287–292; 379/406.01, 406.02–406.09, 406.15, 406.16

(56) References Cited

U.S. PATENT DOCUMENTS

| | | | | |
|---|---|---|---|---|
| 4,901,333 A | * | 2/1990 | Hodgkiss | 375/345 |
| 6,147,979 A | * | 11/2000 | Michel et al. | 370/292 |
| 6,597,787 B1 | * | 7/2003 | Lindgren et al. | 379/406.05 |
| 6,665,402 B1 | * | 12/2003 | Yue et al. | 379/406.04 |

* cited by examiner

Primary Examiner—Ajit Patel

(57) ABSTRACT

A side tone generator which adjusts gain to compensate for echo effects is described. The side tone generator includes a gain unit which receives a voice signal and applies a gain to the voice signal to produce a side tone, and a summing unit which adds the side tone to a speech decoder signal. The side tone generator also includes a side tone gain adapter to adjust the gain added by the gain unit. The side tone gain adapter computes a default gain which would be applied in the absence of echo and multiplies the default gain by an echo correction factor based on the prevailing level of echo in order to determine the gain to be applied.

In another embodiment, an echo canceller employs a filter which receives a filter input based on a speech decoder signal and produces a filter output reflecting an estimate of echo present in the speech decoder signal. The echo canceller also includes an output summing unit which subtracts the filter output from a voice signal to produce an echo canceller output. The echo canceller also includes a feedback loop which employs feedback from the filter output to refine the filter input. The echo canceller also includes a filter adapter which produces updated coefficients for the filter based on the echo canceller output, the voice signal and the filter input.

21 Claims, 5 Drawing Sheets

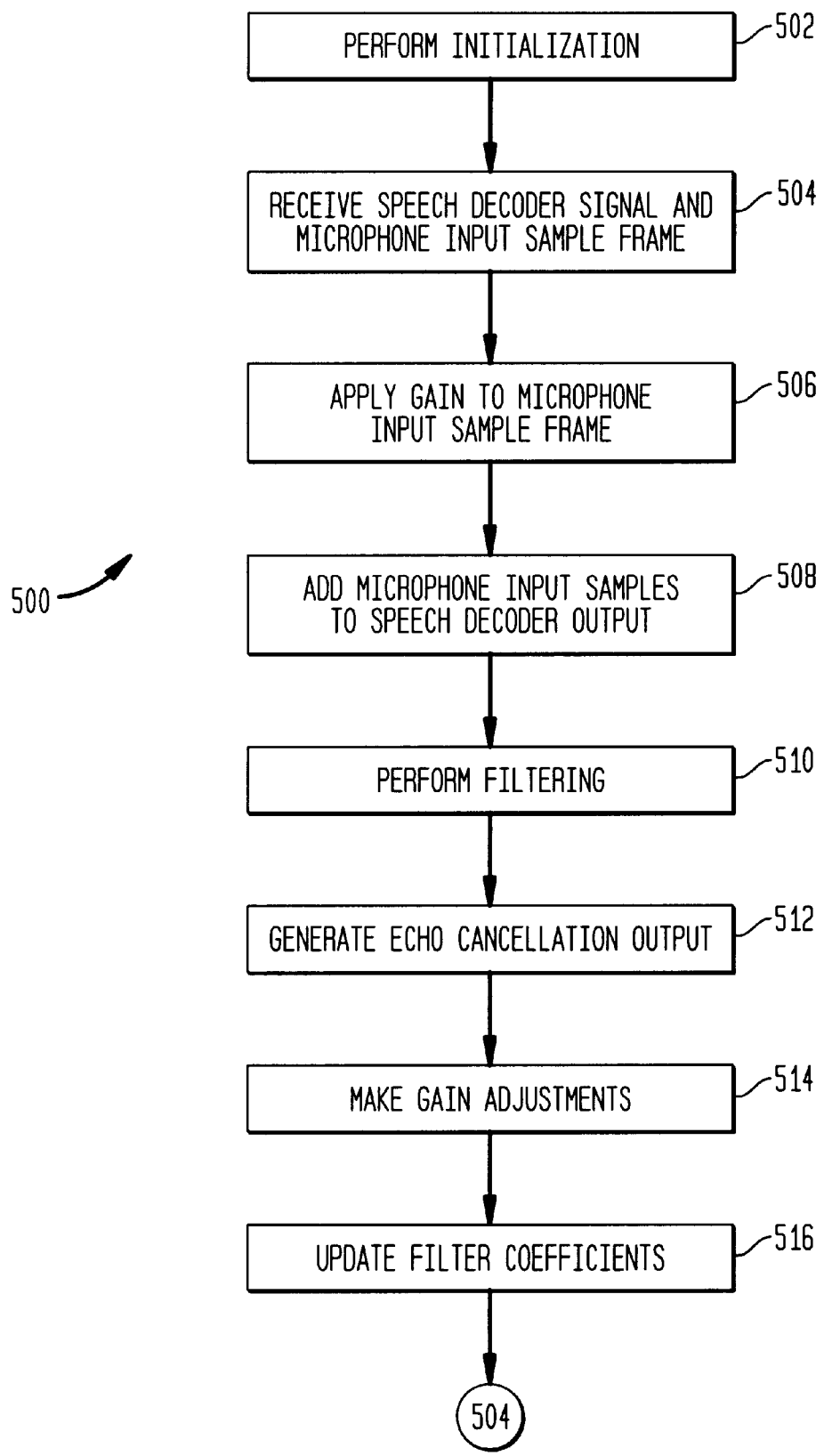

METHODS AND APPARATUS FOR THE PRODUCTION OF ECHO FREE SIDE TONES

FIELD OF THE INVENTION

The present invention relates generally to improvements in digital wireless telephony. More particularly, the invention relates to advantageous aspects of producing echo free side tones during a wireless telephone connection.

BACKGROUND OF THE INVENTION

Conventional wireline telephones produce an output signal called a side tone which is added to the far end speech signal. The side tone is an attenuated version of the microphone input. The sum of the speech signal and the side tone is fed to the speaker in order to provide an audible feedback representing the user's input. The audible feedback gives the user an assurance that the telephone instrument is operating correctly.

In order to recreate the experience of the side tone produced by a wireline telephone, many wireless telephones implement a side tone generator, typically as a software module in a digital signal processor or other processor employed by the wireless telephone. The side tone generator provides an audible feedback reflecting the user's input. The presence of the side tone in the wireless phone gives assurance to the user that the telephone is operating properly. In other words, users may be more comfortable with new technology that accurately mimics the features of old technology with which they have had a long period of familiarity.

The side tone module receives a signal from the A/D converter, reflecting a digital conversion of the user's voice input. The side tone module multiplies the signal by an attenuation factor and adds the result to the signal produced by the speech decoder before the signal is passed to the D/A converter. Consequently, the user hears his or her own voice in the handset, assuring the user that the telephone is functioning properly.

Side tone generators used in wireless telephones are subject to a number of difficulties. For example, a wireless telephone is often used in a noisy environment. When the far end party speaks, the side tone generator will add the noise to the audio output, thus degrading the quality of the received speech.

Another difficulty associated with wireless telephones is echo. Echo occurs when sound travels from the speaker to the microphone and thus is processed and retransmitted back to the far end. Wireline operations are less susceptible to echo because the typical handset used in a wireline operation is larger than many small telephones commonly used in wireless operations. Moreover, the typical wireline handset forms a good seal against the user's ear, preventing sound from escaping to reach the microphone or substantially reducing such sound.

Wireless handsets, on the other hand, are often small so that sound escaping from the earpiece has only a short distance to travel to reach the microphone. Furthermore, wireless handsets are often held a slight distance from the user's ear so that no seal is made. Moreover, wireless communication often introduces a noticeable delay into a transmission, so that the far end party may hear an echo of his or her own voice a noticeable time after speaking. Adding a side tone to a telephone instrument which is subject to echo makes the echo worse by adding feedback of the far end party's voice to an already existing undesired feedback, causing reverberation or other undesirable effects.

In order to remove echo effects from wireless communication, echo cancellers are used to reduce or eliminate echo, typically implemented as software modules. A commonly used prior art echo canceller is an adaptive echo canceller, which performs filtering on the far end signal and adapts the filtering to model the impulse response of the echo path. However, feedback produced by the side tone generator introduces further complications which make it difficult to operate a side tone generator in conjunction with an echo canceller of the prior art such as an adaptive echo canceller. When the far end party speaks, an echo may travel from the earpiece to the microphone. When this happens, the side tone generator produces a side tone responsive to the echo, feeding the echo back into the earpiece. This causes reverberation and increases the duration of the echo. The echo canceller becomes less effective and its adaptation is slowed down. Additionally, if the attenuation of the side tone generator is made variable, changes in the side tone change the effective echo path appearing to the echo canceller, because the side tone contributes to the echo. This adds another source of variability which increases the computational load on, and reduces the effectiveness of, the echo canceller.

Furthermore, times exist when it is not necessary to generate a side tone, for example, when the far end user is talking or when users at both ends are talking. It is therefore an excess consumption of resources for the side tone generator to be active when it is not needed.

There exists, therefore, a need in the art for a side tone generator which reduces the echo in the side tone signal, which reduces the feedback effect on the echo canceller, which operates successfully with an echo canceller which operates entirely within the background, and which reduces processing requirements by becoming inactive when not needed.

SUMMARY OF THE INVENTION

To this end, the present invention provides advantageous methods and apparatus for echo cancellation and side tone generation which address such issues. In one aspect, a side tone generator of the present invention includes a gain unit which receives a voice signal representing a user's voice and applies a gain to the voice signal to produce a side tone. The side tone generator also includes a summing unit which receives a speech decoder signal representing a received far end signal. The summing unit adds the side tone to the speech decoder signal. The voice signal and the speech decoder signal are received and the side tone is computed and added to the speech decoder signal once every sample.

The side tone generator also includes a side tone gain adapter which controls the level of gain applied by the gain unit. The side tone gain adapter receives the voice signal and the speech decoder signal, as well as an echo canceller output representing the voice signal after echo cancellation. The side tone gain adapter computes the gain to be applied by taking the gain which would be applied in the absence of echo and multiplying it by a correction factor based on the prevailing level of echo. The side tone gain adapter computes and updates the gain once every frame.

According to another aspect of the present invention, an echo canceller may suitably include a filter, a filter adapter, a gain unit, an input summing unit and an output summing unit. The filter receives the speech decoder signal and filters it to obtain an estimate of the echo. The output summing unit subtracts the echo estimate from the voice signal in order to remove the estimated echo components from the voice signal to produce an echo adjusted signal. The gain unit applies a gain to the filter output using a gain value supplied by a side tone gain adapter to produce a feedback signal for refining the filter output. The input summing unit adds the speech decoder signal to the feedback signal to produce a refined filter input signal which is supplied to the filter. The input summing unit also supplies the refined filter input signal to the filter adapter.

The filter adapter employs the voice signal, the refined filter input signal and the echo adjusted signal to compute updated filter coefficients, which are then supplied to the filter. The echo canceller operates once every frame. A frame is a set of consecutive samples. A commonly used choice for the number of samples comprising a frame is 160.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates the steps of a process of echo cancellation according to the present invention.

DETAILED DESCRIPTION

Figure 1:
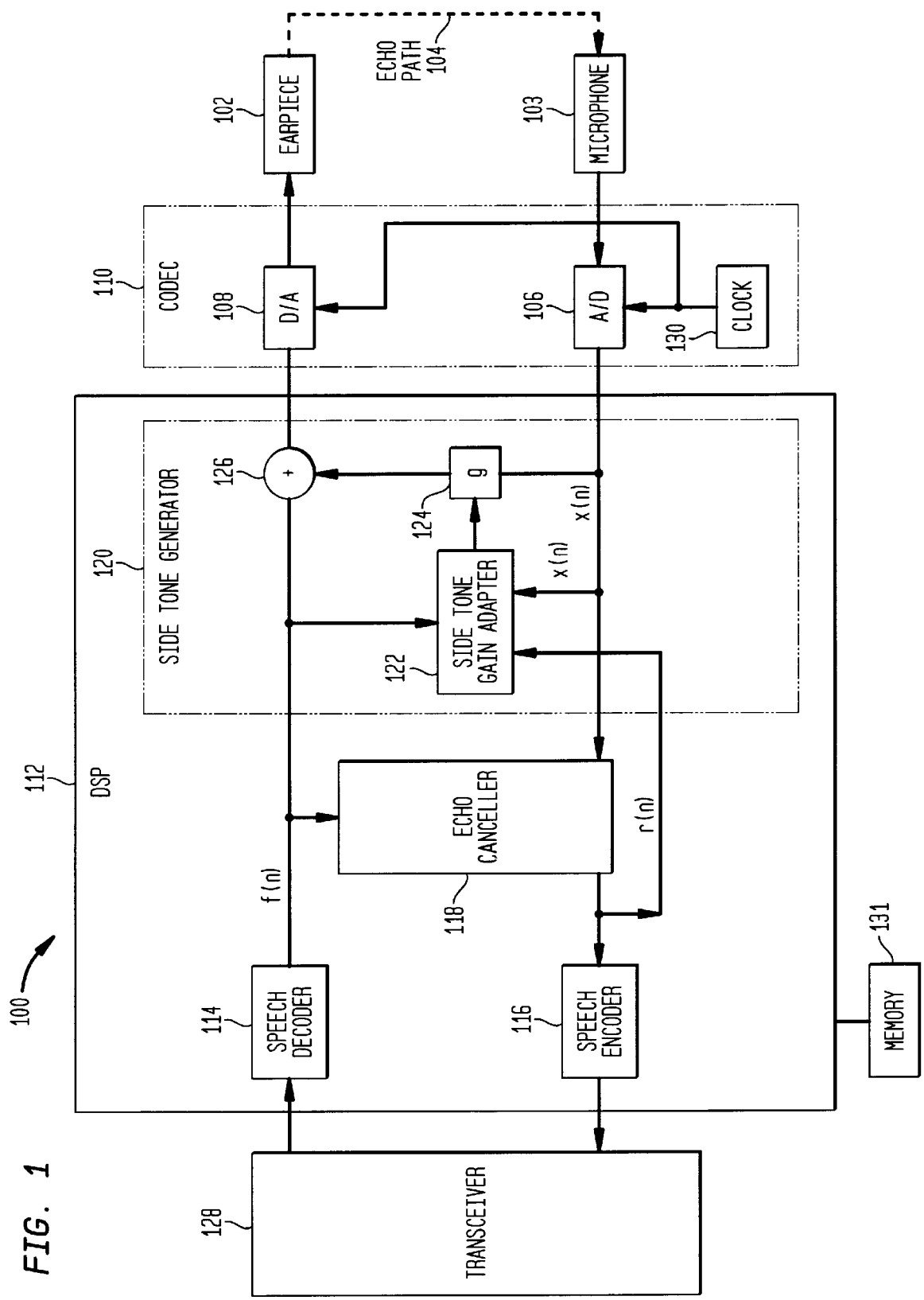
FIG. 1 illustrates a telephone including a side tone generator according to the present invention.

FIG. 1 illustrates a telephone 100 employing an improved echo canceller and side tone generator according to the present invention. The telephone 100 includes an earpiece 102 and a microphone 103. An echo path 104 exists between the earpiece 102 and the microphone 103. The microphone 103 provides signals to an A/D converter 106, and the earpiece 102 receives signals from a D/A converter 108. The A/D converter 106 and the D/A converter 108 are shown here as implemented in a CODEC 110.

Also illustrated is a digital signal processor (DSP) 112 which implements a speech decoder 114 and speech encoder 116, as well as an echo canceller 118 and side tone generator 120. The side tone generator 120 includes a side tone gain adapter 122, a gain unit 124 and a summing unit 126. The telephone 100 also includes a transceiver 128 which transmits and receives RF signals, and a real time clock 130, which produces a clock signal for timing and control of operations. The telephone 100 also includes memory 131 for storing data and intermediate results needed in operation.

When the user speaks, the side tone generator receives a digital voice signal x(n) representing the user's voice after analog to digital conversion by the A/D converter 106. The gain unit 124 applies a gain g to the signal x(n) and passes it to the summing unit 126. The summing unit 126 receives a decoded speech signal f(n) from the speech decoder 114 and adds the side tone g*x(n), which is the voice signal x(n) as altered by the gain unit 124, to produce a modified speech decoder signal including the added side tone. The modified speech decoder signal is then passed to the D/A converter 108, which produces an analog signal and passes it to the earpiece 102, which produces the audible signal for the user.

The gain unit 124 and summing unit 126 operate at a sampling rate. That is, every data sample received from the A/D converter 106 is subjected to gain adjustment and summed with a corresponding sample from the signal f(n) within one sample period. Data samples may suitably be received or produced at a rate of 8000 samples per second. Operating at a sampling rate enables the side tone generator 120 to minimize the delay between the microphone input and the generated side tone. On the other hand, the side tone gain adapter 122 makes adjustments to the gain g at frame rate intervals, suitably occurring once every 160 samples. The echo canceller 118 also operates at frame rate intervals. This reduces the computational load on the DSP 112, reducing the requirements for computational resources and allowing devotion of resources to communication functions and to the encoding and decoding of speech.

In order to minimize echo effects on the operation of the side tone canceller 120, the side tone generator has the following characteristics:

(1) The side tone generator 120 is active, with the value of g at its maximum, when the user speaks and the far end party is quiet;

(2) Changes in the gain g are smooth, with the gain g being unaffected by short pauses in the user's speech;

(3) When the user begins to speak while the far end party is quiet, the gain g switches quickly from zero to its maximum value.

The side tone gain adapter 122 performs processing in order to identify echo and make adjustments to the gain g of the side tone generator 120 according to the presence or absence of echo and to changes in and levels of echo if present. The side tone gain adapter 122 computes the gain g according to the formula $g = g_{signal} g_{echo}$, where $g_{signal}$ is the gain that would be computed for the side tone generator in the absence of an echo. The value of $g_{signal}$ may be computed using speech detection on the echo canceller output signal r(n). An alternative method for computing the value of $g_{signal}$ is disclosed in U.S. Provisional Application Serial No. 60/180,372 assigned to the assignee of the present invention, filed Nov. 22, 1999 and incorporated herein by reference in its entirety.

The value of $g_{echo}$ is a correction factor that is applied in the presence of echo. At steady state, when echo is below a predetermined low echo threshold, the value of $g_{echo}$ is set to 1. This steady state value allows the side tone to be generated without any reduction when there is no echo, or an echo level sufficiently low that it can safely be ignored. During periods when echo is above a predetermined high echo threshold, the value of $g_{echo}$ is set to 0. This prevents the production of a side tone, so that a side tone will not be generated which would exacerbate a high level of echo. During transitions, or when echo is at a very low level relative to the signal being received but still at a sufficiently high level that it cannot be completely ignored, $g_{echo}$ takes on values between one and zero as described below.

The side tone gain adapter 122 computes the value of $g_{echo}$ once per frame according to the equation $g_{echo}(n) = g_{echo}(n-N) + \alpha(\gamma - g_{echo}(n-N))$, where n is an index to the current frame, N is the number of samples per frame, typically 160, $g_{echo}(n-N)$ is the value of $g_{echo}$ in the previous frame, $\gamma$ is a value chosen to represent the echo level in the current frame, with $\gamma=1$ indicating an absence of echo and $\gamma=0$ indicating severe echo, and $\alpha$ is an integration constant between zero and one.

A high value of $\alpha$ allows for faster transitions in the value of $g_{echo}$. If desired, different values of $\alpha$ may be employed depending on the sign of the expression ($\gamma-g_{echo}(n-N)$), referred to as $\alpha_-$ when the sign is negative and $\alpha_+$ when the sign is positive. This allows the rate of change of $g_{echo}$ during a transition from an echo condition to an echo free condition to be different from the rate of change of $g_{echo}$ during a transition from an echo condition to an echo free condition. For example, the value of $\alpha_-$ may be low so that switching from an echo free condition to an echo condition is slow. This allows the echo canceller 118 to track changes in the echo path easily. On the other hand, the value of $\alpha_+$ may be high in order to allow a fast transition from an echo condition to an echo free condition, in order to avoid loss of the beginning of the user's speech.

In order to compute $\gamma$, the echo to signal ratio in the A/D output x(n) is first estimated. Let $P_x$, $P_r$ and $P_f$ be the energies of x(n), r(n) and f(n), respectively, expressed in dB. If the signal x(n) contains mostly echo then $P_x-P_f$ is approximately the echo path gain in dB. It is clear that x(n) contains mostly echo in frames where $P_r$ is significantly lower than $P_x$ for example by 10 dB, because r(n) includes the non echo component in x(n) and the component of the echo which the echo canceller 118 was unable to cancel. Then if $P_r$ is lower than $P_x$ by at least 10 dB, this means that the energy of the non echo component in x(n) is at least 10 dB below the total signal energy. The echo path gain changes as the echo path changes. An estimate of the echo path gain Q is maintained and updated at each frame in which $P_r$ is lower than $P_x$ by at least 10 dB, using the formula $Q_{new}=Q_{previous}+\beta(P_x-P_f-Q_{previous})$ where $Q_{new}$ and $Q_{previous}$ are the new and the previous estimates of Q, and $\beta$ is an integration constant. The value of 10 dB is used here as an exemplary value. An appropriate threshold for a specific design of a telephone such as the telephone 100 should be found empirically. The threshold needs to be sufficiently high that signal is not misidentified as echo, but not so high that an excessive amount of echo goes undetected.

Using the estimate of the echo path gain, an estimate is made in each frame of the echo to signal ratio (ESR) of the value x(n). The value of ESR is expressed in dB and computed by the formula $ESR=Q+(P_f-P_x)$.

If ESR is greater than a threshold $ESR_{high}$, the value of $\gamma$ is set to 0. If ESR is less than a threshold $ESR_{low}$, the value of $\gamma$ is set to 1. When the value of ESR is between the thresholds, the value of $\gamma$ is set to a value which varies linearly with the value of ESR, according to a predetermined relationship chosen during the design of the telephone 100. An exemplary relation between the value of ESR and the value of $\gamma$ is illustrated in FIG. 2 below.

Figure 2:
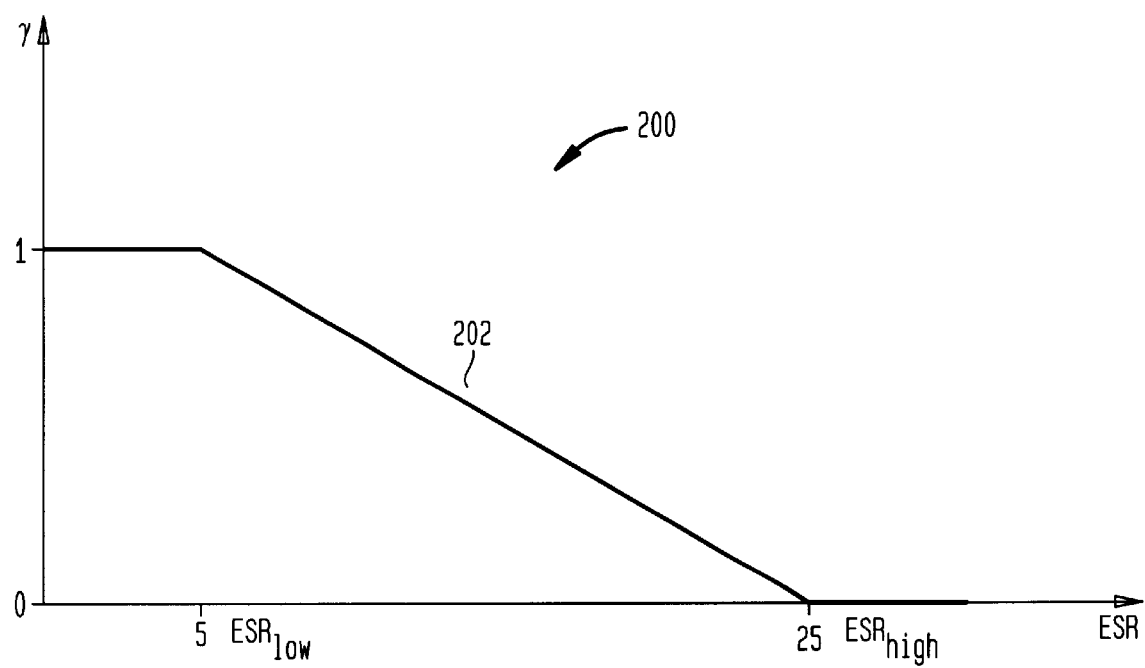
FIG. 2 is a graph illustrating echo level versus echo to signal ratio.

FIG. 2 illustrates a graph 200 showing a curve 202 illustrating $\gamma$ plotted against the value of ESR. When the value of ESR is below a predetermined lower threshold $ESR_{low}$, the value of $\gamma$ is set to 1. When the value of ESR is above a predetermnined upper threshold $ESR_{high}$, the value of $\gamma$ is set to 0. When the value of ESR is between $ESR_{high}$ and $ESR_{low}$, the value of $\gamma$ varies linearly with the value of ESR as shown.

Figure 3:
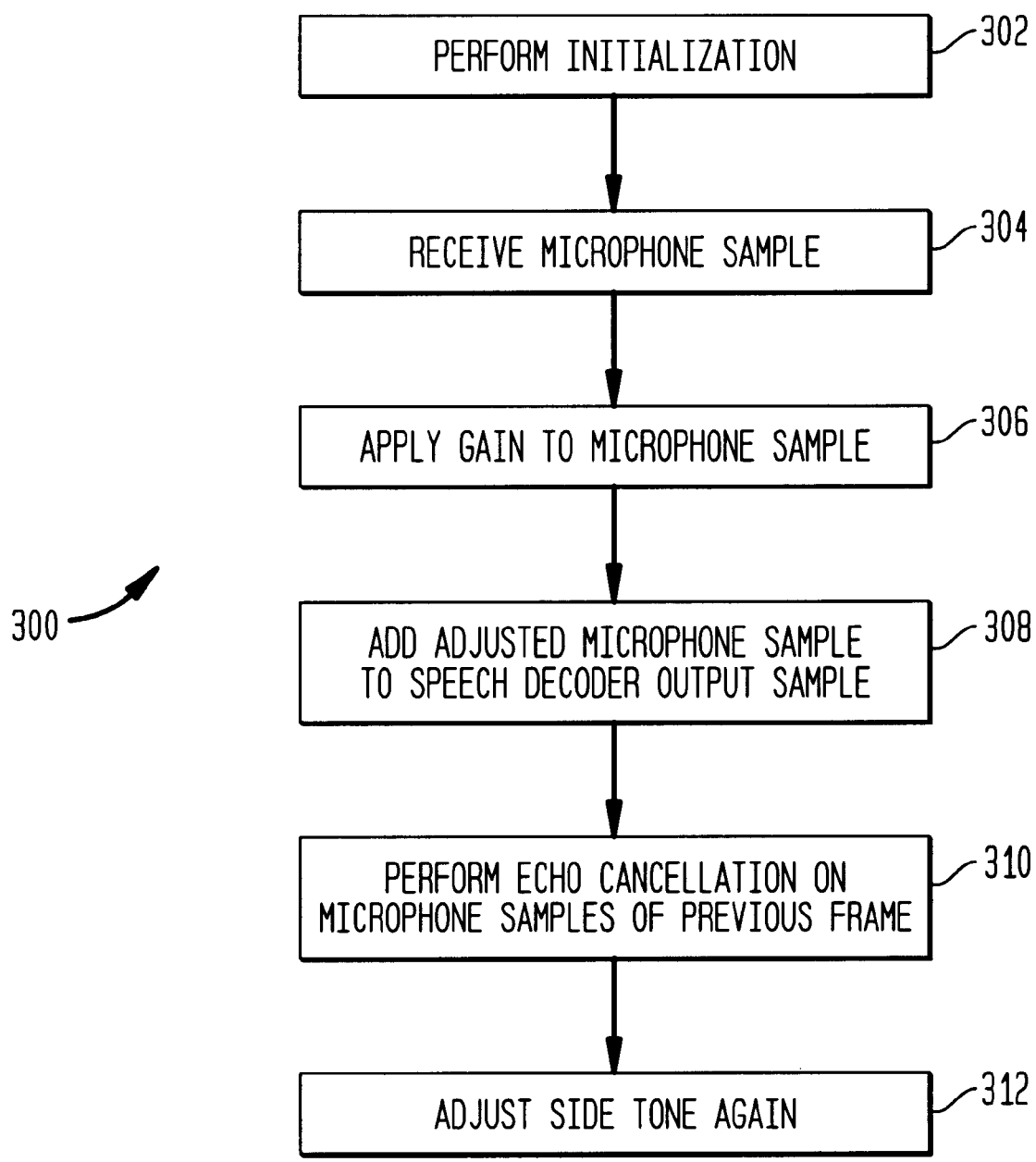
FIG. 3 illustrates the steps of a process of side tone generation according to the present invention.

FIG. 3 illustrates a process 300 of side tone generation according to the present invention. At step 302, initialization is performed and an initial gain is established. At step 304, a microphone sample representing a user voice signal and a speech decoder output sample representing a signal received from a remote station are received. At step 306, the microphone sample is adjusted by applying the gain. At step 308, the adjusted microphone sample is added to the speech decoder output sample to produce an output packet. Steps 304 through 308 are repeated for all data samples in a frame.

At step 310, at the beginning of a new frame, echo cancellation is performed on all microphone samples of the previous frame. At step 312, the side tone gain is adjusted using the microphone input samples, the speech decoder output samples and the echo canceller output in a manner similar to that described above. Steps 310 and 312 use all samples of the previous frame. For a typical frame, the number of samples is 160. The process then returns to step 304.

Figure 4:
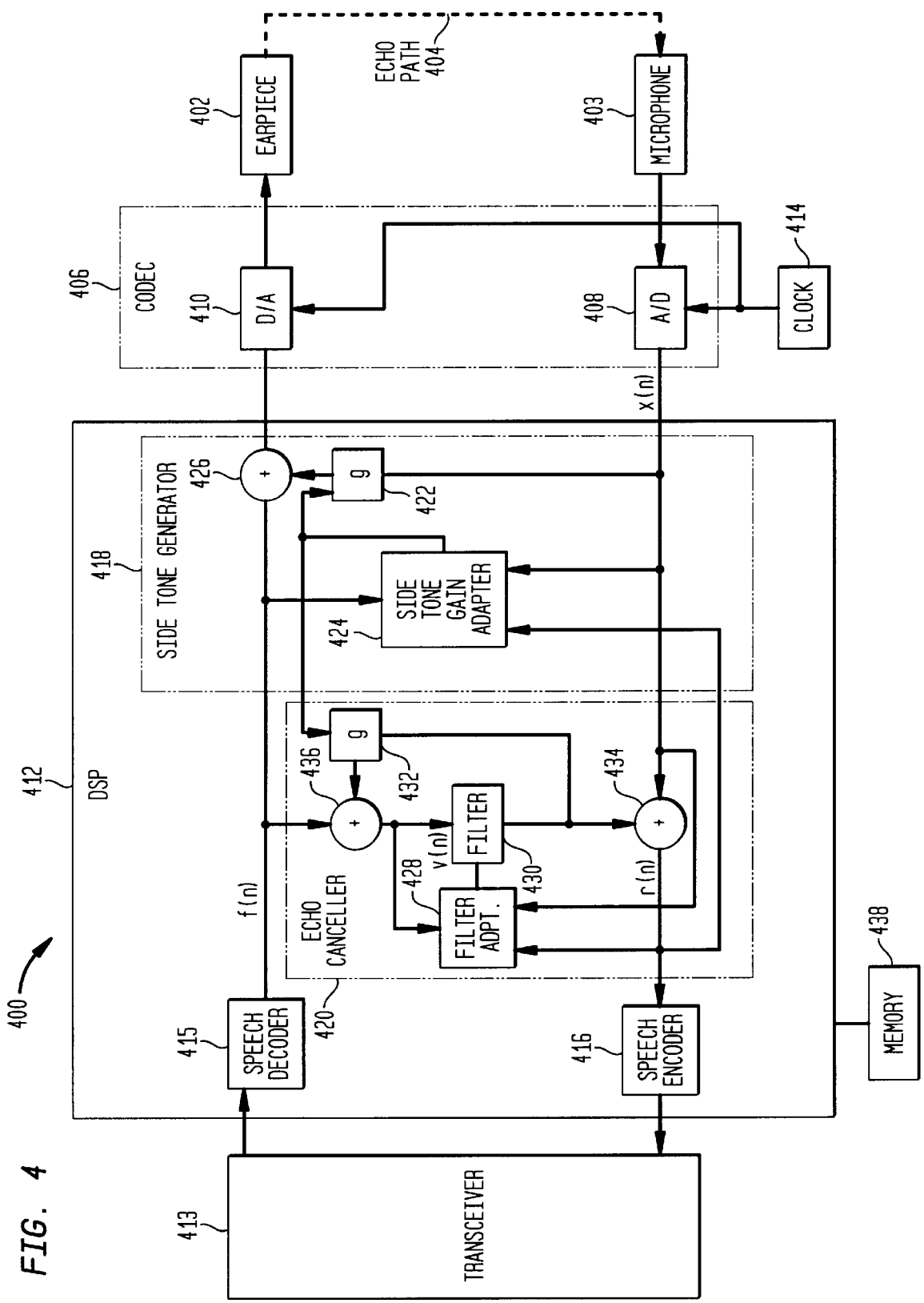
FIG. 4 illustrates an echo canceller according to the present invention.

FIG. 4 illustrates a telephone 400 according to an alternative aspect of the present invention. The telephone 400 employs an earpiece 402 and a microphone 403. An echo path 404 exists between the earpiece 402 and the microphone 403. The telephone 400 also includes a CODEC 406 which comprises an A/D converter 408 and a D/A converter 410. The telephone 400 also includes a DSP 412, transceiver 413 and clock 414. The DSP 412 implements a speech decoder 415, speech encoder 416, side tone generator 418 and echo canceller 420. The side tone generator 418 makes gain adjustments using information produced by the echo canceller 420, as described above in connection with the discussion of FIG. 1. In addition, the echo canceller 420 uses information received from the side tone generator 418 to adjust operation in order to minimize adverse interaction with the side tone generator 418, and also employs feedback in order to model the echo path 404.

The side tone generator 418 includes a side tone gain unit 422, a side tone gain adapter 424 and a summing unit 426. The echo canceller 420 includes a filter adapter 428, a filter 430, an echo canceller gain unit 432, an output summing unit 434 and an input summing unit 436. The telephone 100 also includes memory 438 for storing data and intermediate results needed in operation.

The echo canceller 420 receives a speech decoder signal f(n) from the speech decoder 415 and a voice signal x(n) from the A/D converter 408. The output summing unit 434 subtracts a filter output y(n) from the voice input x(n) to produce the echo canceller output r(n). The filter output y(n) reflects an estimate of echo present in the microphone signal x(n). The echo canceller 420 applies a gain to the filter output y(n) using the gain unit 432, and uses the input summing unit 436 to add the voice decoder signal f(n) to the filter output y(n) with gain applied to produce the filter input v(n). The filter input v(n) reflects the speech decoder signal f(n) refined by feedback from the filter ouptut y(n), which simulates the effect of the side tone on the echo. The gain produced by the gain unit 432 is updated at each frame by the side tone gain adapter 424 at the same time the side tone gain unit 422 is updated.

The echo canceller 420 employs the feedback path to enable the filter 430 to model the echo path 404. If the Z-transform of the impulse response of the echo path 404 is H(z), and the Z-transform of the echo path including the effect of the side tone generator 418 with gain g is $H_g(z)$, then $H_g(z)=H(z)/1-(g^*z^{-1}H(z))$. If the Z-transform of the impulse response of the filter 430 is A(z), the Z-transform of the filter 430 including the refinement provided by the feedback loop including the gain unit 432 and summing unit 436 is $A_g(z)=A(z)/1-(g^*z^{-1}A(z))$.

When the filter 430 is adapted, $A_g(z)$ is a close approximation to $H_g(z)$ and therefore A(z) is a close approximation of H(z). It is clear from the above two equations that as g is changed, both $H_g(z)$ and $A_g(z)$ are modified in the same way, and therefore $A_g(z)$ remains a close approximation of $H_g(z)$, without any need to adapt the filter 430.

It is also clear from these equations that the duration of the impulse response corresponding to $H_g(z)$ may be much longer than that of H(z) because of oscillations generated by the poles in the denominator of the expression used to compute $H_g(z)$. However, the use of the feedback loop to modify the filter input v(n) allows modeling of a long impulse response of $H_g(z)$ with the Z-transform A(z) of the filter 430 having a duration similar to that of H(z), thus gaining a significant saving in computations.

FIG. 5 illustrates a process 500 of side tone production and echo cancellation according to the present invention. At step 502, initialization is performed, with initial gain and filter coefficients established. At step 504, a speech decoder signal and a frame of microphone input samples representing a voice input signal are received. At step 506, the microphone input frame is adjusted by applying the gain. At step 508, the adjusted microphone input frame is added to the speech decoder signal to produce a refined speech decoder signal. Steps 504 through 508 are repeated for each microphone input sample in the frame as it becomes available.

At step 510, at the beginning of a new frame, the speech decoder signal is subjected to filtering to produce a filter output signal. The filtering includes employing a feedback loop to refine the filtering process. The speech decoder signal is summed with a modified filter output signal resulting from applying the gain to a filter output signal resulting from the filtering process in order to produce a refined filter input signal. At step 512, the filter output signal is subtracted from the voice signal to produce an echo cancellation output signal reflecting a the voice signal with echo removed. At step 514, gain adjustments are made using the microphone input, the speech decoder output and an echo canceller output as inputs. At step 516, the filter input signal and the echo cancellation output signal, along with the microphone input frame, are used to update echo cancellation filter coefficients. The process then returns to step 504. It should be clear that while steps 502–516 are described as occurring sequentially, the may suitably occur partially or completely in parallel.

While the present invention is disclosed in the context of a presently preferred embodiment, it will be recognized that a wide variety of implementations may be employed by persons of ordinary skill in the art consistent with the above discussion and the claims which follow below.

We claim:

1. A side tone generator, comprising:
   a gain unit for receiving a voice signal and applying a gain to the voice signal to produce a side tone;
   a summing unit for receiving the side tone and a received far end signal and adding the side tone to the received far end signal;
   a side tone gain adapter for receiving the voice signal, the received far end signal and an echo adjusted voice signal produced by an echo canceller and using the voice signal, the received far end signal and the echo adjusted voice signal to compute the gain of the gain unit.

2. The side tone generator of claim 1 wherein the side tone gain adapter computes the gain of the gain unit at periodic intervals.

3. The side tone generator of claim 2 wherein the side tone gain adapter computes a default gain which would be applied if no echo were present and multiplies the default gain by an echo correction factor to produce the gain.

4. The side tone generator of claim 3 wherein the echo correction factor is computed by adding the correction factor for an immediately preceding time interval to a product of an integration constant and a difference between an echo level for the current time interval and the correction factor for the immediately preceding time interval.

5. The side tone generator of claim 4 wherein the echo level is determined by an echo to signal ratio of the voice signal.

6. The side tone generator of claim 5 wherein the received far end signal is a speech decoder signal.

7. The side tone generator of claim 6 wherein the voice signal comprises a series of digital samples representing a microphone input and each of the speech decoder signal and the echo adjusted voice signals comprises a series of samples, each sample being produced during one of a series of sample intervals, the samples being organized into frames, each frame comprising a predetermined number of sequential samples, each frame occurring during a frame interval, and wherein the side tone gain adapter computes the gain once during each frame interval.

8. The side tone generator of claim 7 wherein the immediately preceding time interval is a previous frame interval and wherein the current time interval is a current frame interval.

9. An echo canceller comprising:
   a filter for receiving a filter input and producing a filter output reflecting an echo estimate;
   an output summing unit for receiving a voice signal and subtracting the filter output from the voice signal to produce an echo canceller output;
   a gain unit for receiving the filter output and applying a gain to the filter output to produce an adjusted filter output;
   an input summing unit for receiving a speech decoder signal and adding the adjusted filter output to produce the filter input; and
   a filter adapter for receiving the voice signal, the echo canceller output and the filter input to compute updated coefficients for the filter, the filter being operative to compute the updated coefficients and supply the updated coefficients to the filter once during each of a series of periodic intervals.

10. The echo canceller of claim 9 wherein the gain unit periodically receives an updated gain value from a side tone gain adapter.

11. The echo canceller of claim 10 wherein the filter coefficients are updated based on the updated gain value received from the side tone adapter.

12. The echo canceller of claim 11 wherein the filter input and the filter output comprise a series of samples occurring at sample intervals, wherein the voice signal comprises a series of samples representing a microphone input and wherein the filter is operative to compute the updated coefficients and supply the updated coefficients to the filter once during each of a series of frames, each frame comprising a predetermined number of sequentially occurring samples, each frame occurring during a frame interval, and wherein the series of periodic intervals is a series of frame intervals.

13. The echo canceller of claim 12 wherein the gain unit receives an updated gain value from a side tone gain adapter once per frame interval.

14. A method of side tone generation for a wireless telephone receiving a voice signal and a far end signal, comprising the steps of:
   (a) establishing an initial gain
   (b) receiving a voice signal and a far end signal occurring during a predetermined interval;

(c) applying the gain to the voice signal sample to produce a side tone;

(d) adding the side tone to a speech decoder signal sample;

(e) for each predetermined in a series of predetermined intervals, returning to step (b);
   at a beginning of a subsequent predetermined interval, computing an updated gain using the voice signal, the far end signal and an echo canceller output; and returning to step (b).

15. The method of claim 14 wherein the step of computing the updated gain includes computing a gain value that would be applied in the absence of echo and multiplying the gain value by an echo correction factor based on adding the correction factor for an immediately preceding predetermined interval to a product of an integration constant and a difference between an echo level for the current predetermined interval and the correction factor for the immediately preceding predetermined interval.

16. The method of claim 15 wherein the integration constant is chosen to allow a faster transition from an echo condition to an echo free condition than from an echo free condition to an echo condition.

17. The method of claim 16 wherein the echo level is computed according to an echo to signal ratio and wherein the echo to signal ratio is computed by a difference in energy levels between the far end signal and the voice signal.

18. The method of claim 17 wherein the far end signal is a speech decoder signal and wherein each of the voice signal and the speech decoder signal comprise a series of samples occurring at sample intervals, the samples being organized into a series of frames, each frame comprising a predetermined number of sequential samples, each frame occurring at a frame interval and wherein the predetermined intervals are frame intervals.

19. A method of echo cancellation, comprising the steps of:
   receiving a speech decoder signal;
   filtering the speech decoder signal using a feedback loop to apply a gain to a filter output to produce a feedback value and adding the feedback value to the speech decoder signal to produce a filter input to be filtered to produce the filter output reflecting an estimate of echo in the speech decoder signal;
   receiving a voice signal; and
   subtracting the voice signal from the speech decoder signal to produce modified voice signal with echo removed.

20. The method of claim 19 and also including a step of periodically generating updated filter coefficients for use in the step of filtering the speech decoder signal, the updated filter coefficients being computed using the voice signal, the filter input and the modified voice signal.

21. The method of claim 20 wherein the voice signal, the filter input and the modified voice signal each comprise a series of samples occurring at sample intervals and wherein the samples are organized into a series of frames, each frame comprising a series of sequential samples, and wherein the updated filter coefficients are generated once during each frame.

* * * * *